United States Patent [19]

Mitsuda et al.

[11] Patent Number: 5,019,464
[45] Date of Patent: May 28, 1991

[54] MOLTEN CARBONATE FUEL BATTERY WITH ELECTROLYTE MIGRATION CONTROL

[75] Inventors: Kenro Mitsuda; Hideo Maeda; Hiroaki Urushibata; Toshiaki Murahashi, all of Amagasaki, Japan

[73] Assignee: Mitsubishi Denki Kabushiki Kaisha, Tokyo, Japan

[21] Appl. No.: 499,656

[22] Filed: Mar. 27, 1990

[30] Foreign Application Priority Data

Aug. 3, 1989 [JP] Japan ................................ 1-203221

[51] Int. Cl.$^5$ ............................................. H01M 8/14
[52] U.S. Cl. ........................................ 429/34; 429/16
[58] Field of Search ................. 429/16, 34, 38, 39, 429/12

[56] References Cited

U.S. PATENT DOCUMENTS 4,579,788 4/1986 Marianowski et al. ............... 429/16
4,643,954 2/1987 Smith ..................................... 429/26
4,761,348 8/1988 Kunz et al. ............................ 429/35

OTHER PUBLICATIONS

Journal of Electrochemical Society, vol. 134, No. 1, pp. 105-113.

Primary Examiner—Anthony Skapars
Attorney, Agent, or Firm—Thomas Morrison

[57] ABSTRACT

A molten carbonate fuel battery comprises a stack of molten carbonate fuel cells. A half-cell anode and a half-cell cathode are disposed at the positive and negative ends which are defined by the end cathode and end anode, respectively, of the stack, with respective separators disposed therebetween. The half-cell anode includes an anode electrode and an anode reaction gas flow path, but does not include a matrix, and the half-cell cathode includes a cathode electrode and a cathode reaction gas flow path, but does not include a matrix.

2 Claims, 5 Drawing Sheets

MOLTEN CARBONATE FUEL BATTERY WITH ELECTROLYTE MIGRATION CONTROL

This invention relates to molten carbonate fuel batteries comprising a stack of unit cells, and, more particularly, to improved molten cebonate fuel cell stacks in which the effects of electrolyte migration is delayed and controlled, so that a long life is given to the stacks.

BACKGROUND OF THE INVENTION

It is known that when conventional molten carbonate fuel batteries comprising a stack of molten carbonate fuel cells are operated, electrolyte migration or even electrolyte redistribution (i.e. change of electrolyte composition) occurs. This has greatly impeded practical use of molten carbonate fuel batteries. Due to the electrolyte migration, the cells which are nearer to the cathode defining the positive end of the stack (hereinafter this cathode being referred to as "end cathode", because it defines one end of the stack) are more depleted of electrolyte, while the cells which are nearer to the anode defining the negative end of the stack (hereinafter this anode being referred to as "anode", because it defines the other end of the stack) are more flooded with electrolyte. It is known that the electrolyte migration is caused by leakage current flowing through manifold gaskets which are used for attaching manifolds to stack surfaces. The flooding and depletion of electrolyte severely impair the performance of the battery.

The electrolyte migration also causes the conductivity of electrolyte to decrease, which also impairs the performance of the battery. it is difficult to eliminate change of electrolyte composition (i.e. electrolyte redistribution), and, therefore, a technique has been proposed to delay the effects of electrolyte migration by providing a larger capacity for the electrolyte for the end cathode and end anode of the fuel cell stack than the rest of the stack to reduce the effects of electrolyte depletion and electrolyte flooding.

As described above, conventional molten carbonate fuel batteries as described above are subject to electrolyte depletion and flooding, and, therefore, they may have to be disposed of even before their economical lives end. Molten carbonate fuel batteries employing the above-described arrangement for delaying the effects of electrolyte migration cannot provide a satisfactory result, and, furthermore, the unit cells with the end cathode and end anode must be manufactured in accordance with special specifications different from those of other ordinary molten carbonate cells and, therefore, cannot be manufactured on ordinary mass-production lines. Accordingly, the manufacturing cost of such batteries is significantly high.

According to the present invention, molten carbonate fuel batteries are provided, which are free of the above-stated disadvantages of conventional molten carbonate fuel batteries. Molten carbonate fuel cells in the stacks of the batteries of the present invention have a structure manufactured in accordance with specifications similar to those of ordinary cells, but the fuel cell stack of the present invention is so arranged that electrolyte can be effectively supplied to the end cathode defining the positive end of the fuel cell stack and can be effectively absorbed from the end anode defining the negative end of the fuel cell stack.

SUMMARY OF THE INVENTION

According to the present invention, a molten carbonate fuel battery comprises a stack of molten carbonate fuel cells. The stack includes what is called a half-cell anode arranged outside the end cathode defining the positive end of the stack with a separator disposed between the end cathode and the half-cell anode. The half-cell anode includes an anode electrode and an anode reaction gas flow path, but it does not include a matrix. The stack includes further what is called a half-cell cathode arranged outside the end anode defining the negative end of the stack with a separator disposed between the half-cell cathode and the end anode. The half-cell cathode includes a cathode electrode and a cathode reaction gas flow path, but it does not include a matrix.

The half-cell anode in the fuel cell stack according to the present invention serves to supply the electrolyte to the end cathode which is adjacent to the half-cell anode, while the half-cell cathode absorbs the electrolyte from the end anode which is adjacent to the half-cell cathode. Thus, the time required for the end cathode of the stack to be depleted of the electrolyte can be substantially extended. The electrolyte flooding into the reaction gas flow path of the half-cell cathode of the fuel cell stack of the present invention is flushed into a reaction gas manifold due to its own flowing energy. Accordingly, thereis no fear, at all, of the flooding of the end anode with the electrolyte. The strcutures of the half-cell anode and half-cell cathode of the present invention are similar to those of the other anodes and cathodes of the cells in the stack, and, therefore, the use of such half-cell anode and cathode does not cause increase of the manufacturing cost.

BRIEF DESCRIPTION OF THE DRAWINGS

Throughout the drawings, the same reference numerals denote similar items or functions.

DESCRIPTION OF PREFERRED EMBODIMENT

Prior to describing a stack of molten carbonate fuel cells of a battery of the present invention, conventional molten carbonate fuel batteries and cell stacks used therein are further described.

Fuel cell stacks of molten carbonate fuel batteries per se are well-known and have been described in various publications and patent specifications available for public inspection. For example, Japanese Unexamined Patent Publication No. SHO 63-279575 (corresponding to U.S. Ser. No. 26819 which issued as U.S. Pat. No. 4,761,348 to H. R. Kunz et al.) discloses in detail a typical molten carbonate fuel cell stack. In this typical fuel cell stack, each cell comprises a porous, sintered nickel-chromium anode electrode and a porous nickel-oxide cathode electrode which are disposed on opposite major surfaces of a porous electrolyte matrix so as to sandwich the matrix. The matrix of, for example, lithium aluminate ($LiAlO_2$) or other inert ceramic is filled with molten alkali metal carbonate electrolyte (e.g. $Li_2Co_3/K_2CO_3$). Anode and cathode reaction gas flow paths are provided in the anodes and cathodes, respectively. Typically, hundreds of unit fuel cells are stacked.

Figure 1:
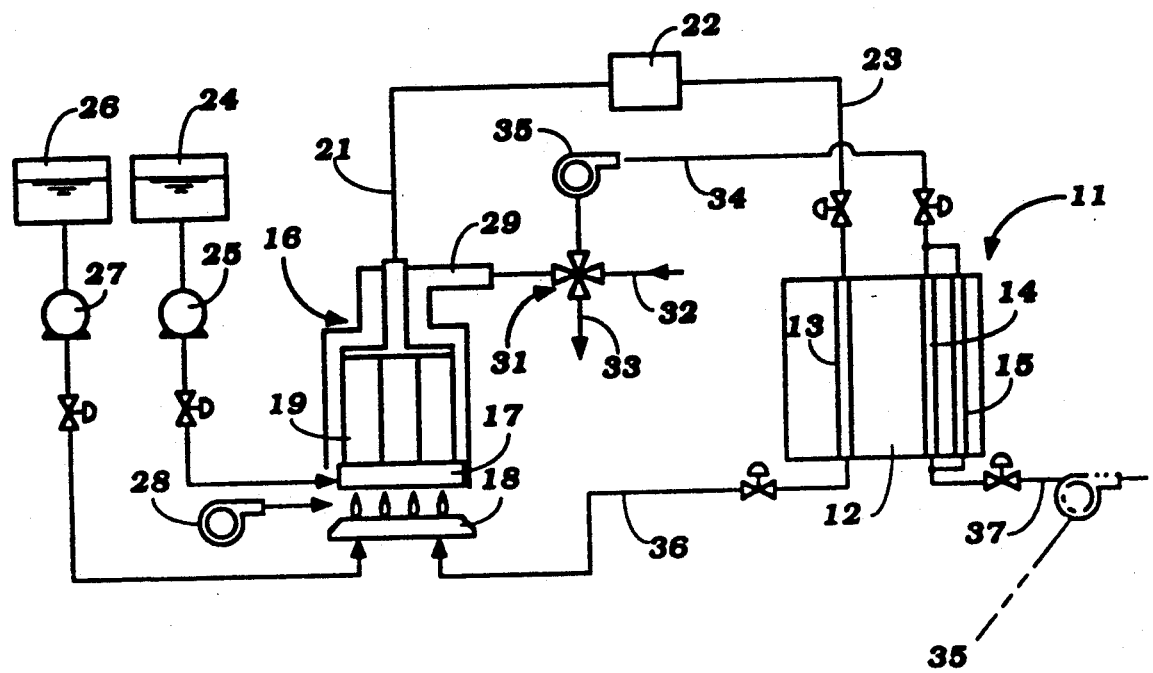
FIG. 1 is a partially-broken perspective view of a major portion of a battery comprising a conventional stack of molten carbonate fuel cells.

FIG. 1 is a partially broken-away perspective view of the conventional molten carbonate fuel cell stack shown in the previously referenced Japanese Unexamined Patent Publication No. SHO 63-279575. In FIG. 1, the fuel cell stack 20 comprises a stack of a plurality of cells 1. A surface 2 of the stack is a fuel inlet surface, and a surface 3 is an oxidant inlet surface of the stack. A negative collector electrode 41 is disposed at one end of the stack, and a positive collector electrode 42 is disposed at the other end of teh stack. A manifold (not shown) is attached to each of the stack surfaces 2 and 3 with a porous gasket (gas sealing member) 5 interposed therebetween. Thus, gas sealing is provided between the manifolds and the stack surfaces 2, 3 by a wet seal provided by the electrolyte contained in the gaskets 5.

Figure 2:
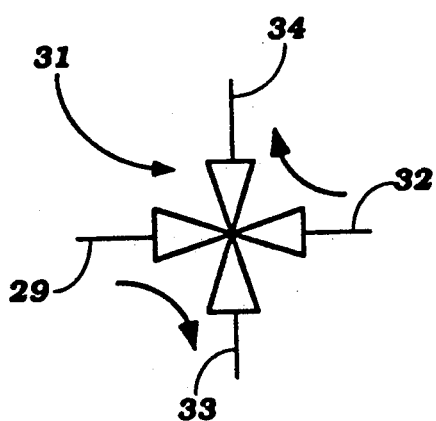
FIG. 2 is a cross-sectional view of a major portion of a first example of a conventional fuel cell stack.

As previously stated, it is well-known that when the fuel cell stack of the above-described arrangement is operated, the electrolyte migration occurs and the electrolyte composition is redistributed, which impedes the practical use of molten carbonate fuel batteries. The electrolyte migration is discussed in detail in, for example, and article entitled "Transport of Electrolyte in Molten Carbonate Fuel Cells" by H. R. Kunz, *J. Electrochemical Soc.*, Vol. 134, No. 1, Jan. 1987, Pages 105-113. FIG. 2 shows a cross-section of the stack used for discussion in the article. In FIG. 2, a manifold 6 is attached to a stack surface with a gasket 5 interposed therebetween. An arrow 7 indicates the direction in which lithium ions $Li^+$ and potassium ions ($K^+$) migrate, and an arrow 8 indicates the direction, in which carbonate ions ($CO_3^{2-}$) migrate. For ease of understanding, each cell 1 is shown as comprising an anode (A), which comprises an anode electrode and an anode reaction gas flow path, and a cathode, which comprises a cathode electrode and a cathode reaction gas flow path, and the anodes and cathodes of the respective cells are numbered in sequence from the bottom to the top of the stack, so that the cathodes and anodes are indicated as C1, A1, C2, A2, C3, A3, . . . , C100, A100, respectively. The stack shown in FIG. 2 includes a hundred (100) cells 1. A gas impermeable separator sheet 9 is disposed between adjacent cells, and a matrix 10 is disposed between the anode (A) and the cathode (C) of each cell 1. The cathode C1 at one end of the stack is the end cathode 21, which defines the positive end of the stack, while the anode A100 at the other end is the end anode 22, defining the negative end of the stack.

As a result of the electrolyte migration in the stack of FIG. 2, the nearer to the end cathode 21 of the stack, the cells are more depleted of the electrolyte, and the nearer to the end anode 22, the cells are more flooded with the electrolyte. It is known that the migration of electrolyte is attributable to leakage current which flows in the manifold gaskets 5. As leakage current flows, the electrolyte migrates toward the end anode. The electrolyte depletion and flooding severely impair the performance of the battery. The reason why such leakage current flows in the manifold gaskets is as follows. In the state of art, it is inevitable for the gaskets 5 to be wetted with the electrolyte to thereby provide a wet seal. Thus, the gasket 5 is in contact with the cells 1, being always wet with the electrolyte. The gaskets 5, therefore, short-circuit, for example, A1 and C2, A2 and C3, . . . , A99 and C100, and, leakage current, though it may be small, flows. As a result, lithium ions $Li^+$) and potassium ions ($K^-$) move toward cells located in the upper portion in FIG. 2, as indicated by arrow 7, while carbonate ions ($CO_3^{2-}$) move toward cells located in the lower portion in FIG. 2, as indicated by the arrow 8. The lithium ions ($Li^+$) and the potassium ions ($K^+$) react with carbon dioxide in the upper cells to form lithium carbonate and potassium carbonate, respectively, while, in the lower cells, the carbonate ions produce carbon dioxide, which is released out of the battery. Then, the amount of the electrolyte in the upper cells increases, whereas the amount of the electrolyte in the lower cells decreases, which, ultimately, results in the migration of the electrolyte. Furthermore, due to difference in transference number between the lithium ions ($Li^+$) and the potassium ions ($K^{30}$), the electrolyte composition (i.e. the ration of lithium and potassium in the electrolyte) also changes, which results in reduction of the electrical conductivity of the electrolyte. Then, the performance of the battery is degraded.

Figure 3:
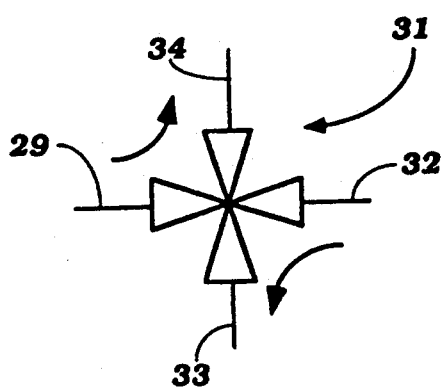
FIG. 3 is a cross-sectional view of a major portion of a second example of conventional fuel cell stack.

It is difficult to eliminate such electrolyte redistribution (i.e. change in the electrolyte composition). Therefore, a technique has been proposed, according to which the effects of electrolyte migration are delayed by providing a larger electrolyte reserving capacity for the end cathode 21 and the end anode 22 than the remaining cells, so that the effects of electrolyte depletion and flooding can be reduced. Such a technique is shown in the previously referenced Japanese Unexamined Patent Publication No. SHO 63-279575. This structure is illustrated in FIG. 3. In the structure shown in FIG. 3, an end cathode 13 and an end anode 14 each has an increased thickness so that the capacity for reserving the electrolyte is larger. With this arrangement, the time for the cell A1-C1 to be depleted and for the cell A10-0-C100 to be flooded to such a degree that the stack cannot operate further, can be extended relative to the stack shown in FIG. 2. However, the ranges of allowable electrolyte depletion and flooding of operating cells are narrow, and, therefore, this arrangement cannot be expected to achieve much improvement. Furthermore, this arrangement requires the end cathode 13 and the end anode 14 of larger thickness than the anode and the cathode of other ordinary cells to be specially manufactured. That is, the end anode and end cathode of this arrangement cannot be manufactured on the mass-production line as other ordinary cells, which causes substantial increase of the cost of the battery.

Figure 4:
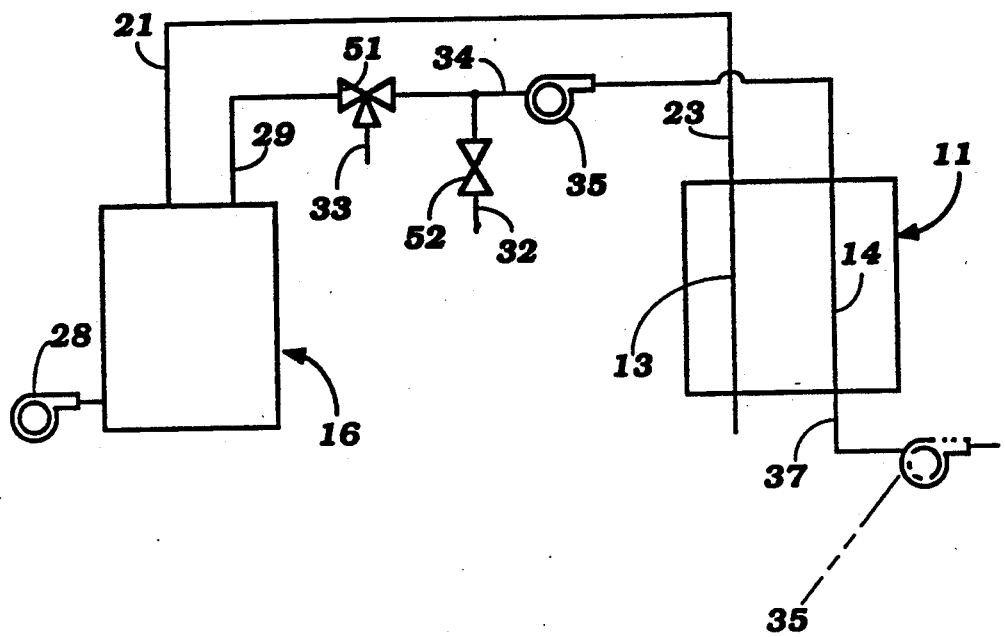
FIG. 4 is a cross-sectional view of a major portion of a third example of conventional fuel cell stack.

Japanese Unexamined Patent Publication No. SHO 63-279575 discloses another example of a molten carbonate fuel cell stack, which is illustrated in FIG. 4. As shown in FIG. 4, a first porous reservoir layer (R1) 15 is disposed outside an end anode A100 with a separator 91 interposed therebetween, and a second porous reservoir layer (R2) 16 is disposed outside an end cathode C1 with a separator 92 interposed therebetween. The electrolyte is reserved in the second porous reservoir layer (R2) 16. The side surface of the first reservoir layer 15 facing to the oxidant gas inlet surface 3 (FIG. 1) of the stack is not provided with edge gas sealing, but it is exposed to the oxidant gas atmosphere, and the side surface of the second reservoir layer 16 facing to the fuel gas inlet surface 2 (FIG. 1) of the stack is not provided with edge gas sealing, but it is exposed to the fuel gas atmosphere. The first and second porous reservoir layers 15 and 16 are electron-conductive porous members which do not perform any cell function, but which do not give any adverse influence to the stack even when the amount of electrolyte contained therein increases or decreases. Thus, the manifestation of the effects of the electrolyte migration should be delayed, relative to the arrangement shown in FIG. 3, by an amount of time in which the porous members are filled or depleted completely with the electrolyte. However, experiments conducted by the inventors revealed that since the electrolyte migration from the second reservoir layer (R2) 16 to the cathode C1 (end cathode 21) and the electrolyte migration from the anode A100 (end anode 22) to the first reservoir layer (R1) 15 were insufficient, the delay of manifestation of the effects of the electrolyte was longer in the arrangement of FIG. 3 than in FIG. 4. That is, better results can be obtained from the arrangement of FIG. 3 than the arrangement of FIG. 4. The reason may be as follows. In the structure of FIG. 4, the reservoir layers 15 and 16 do not have reaction gas flow paths and, therefore, contact with the reaction gases only at their respective side surfaces of small areas. Accordingly, only a small current flowing through the gaskets 5 between R2 and C1 and between A100 and R1 causes large concentration polarization at R1 and R2, so that no electrochemical potential difference is produced between R2 and C1 or between A100 and R1. Then, the electrolyte migration from the reservoir layer R2 to the cathode C1 and from the anode A100 to the reservoir layer R1 does not occur. Furthermore, the structure of the reservoir layers R1 and R2 differs from that of the ordinary cells, which disadvantageously causes increase of the cost of the battery, too.

Figure 5:
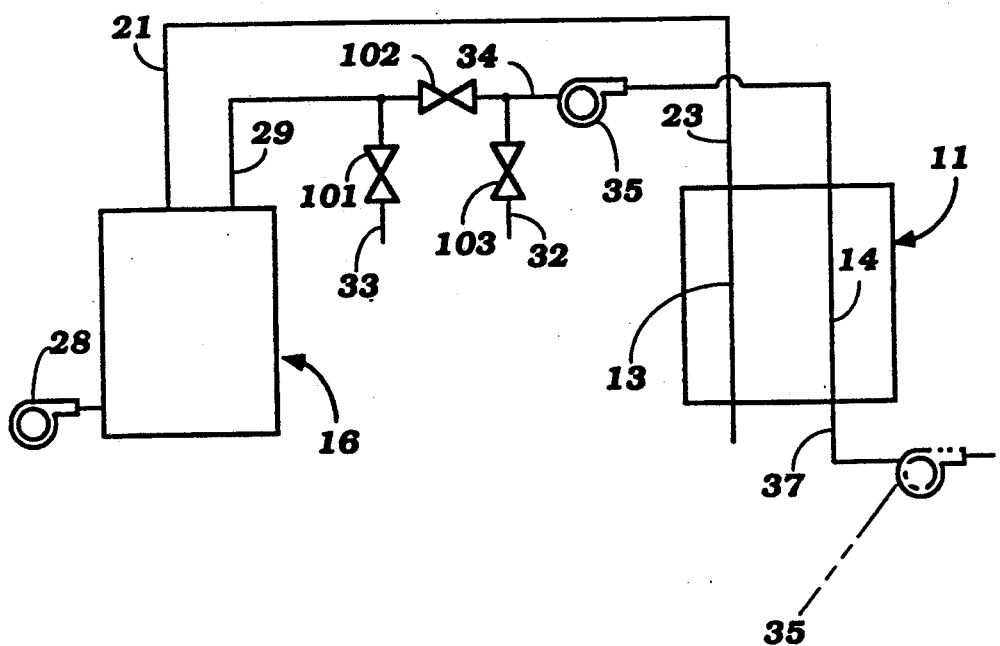
FIG. 5 is a cross-sectional view of a major portion of fuel cell stack of a molten carbonate fuel battery according to one embodiment of the present invention.
Figure 3:
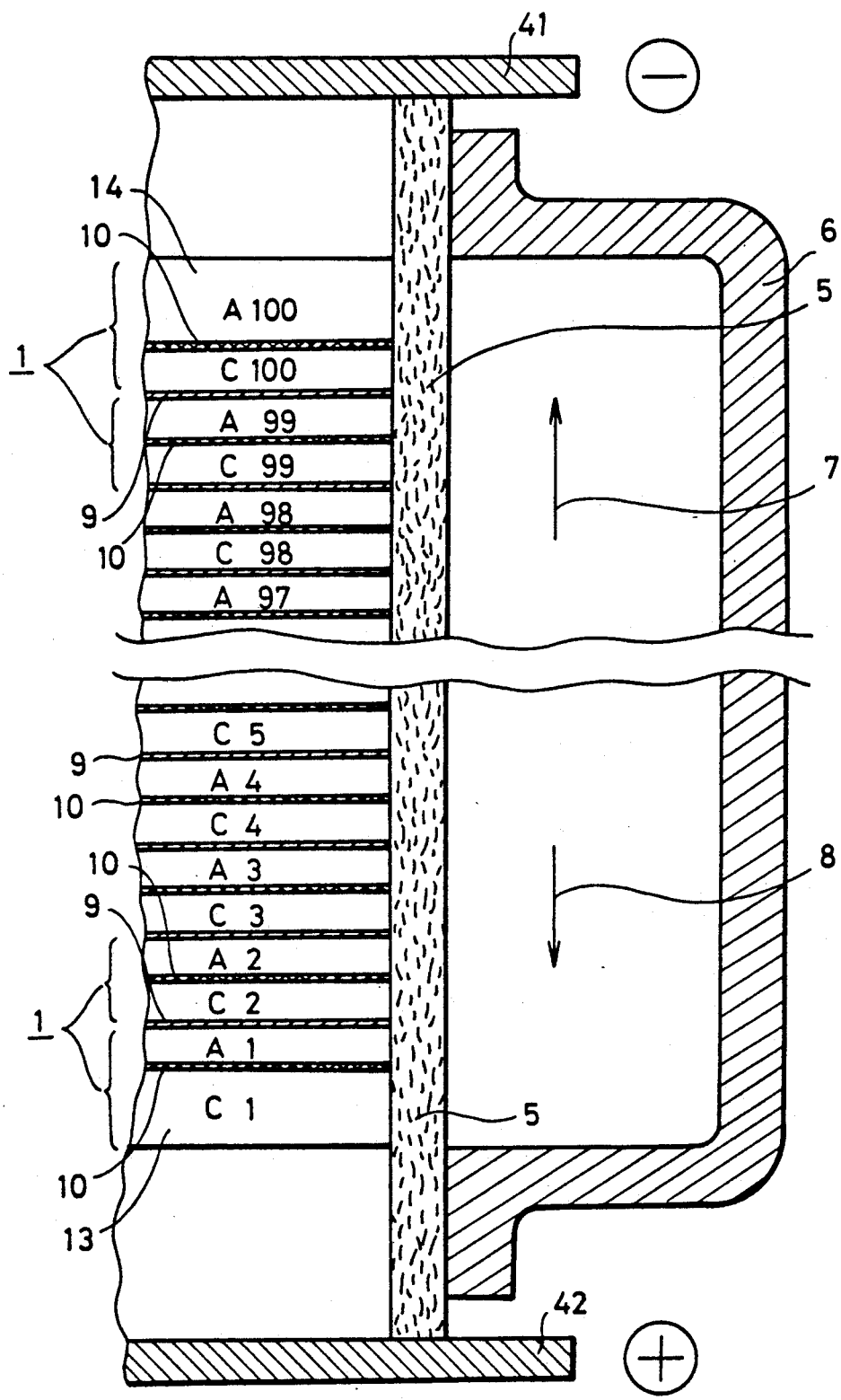
Figure 4:
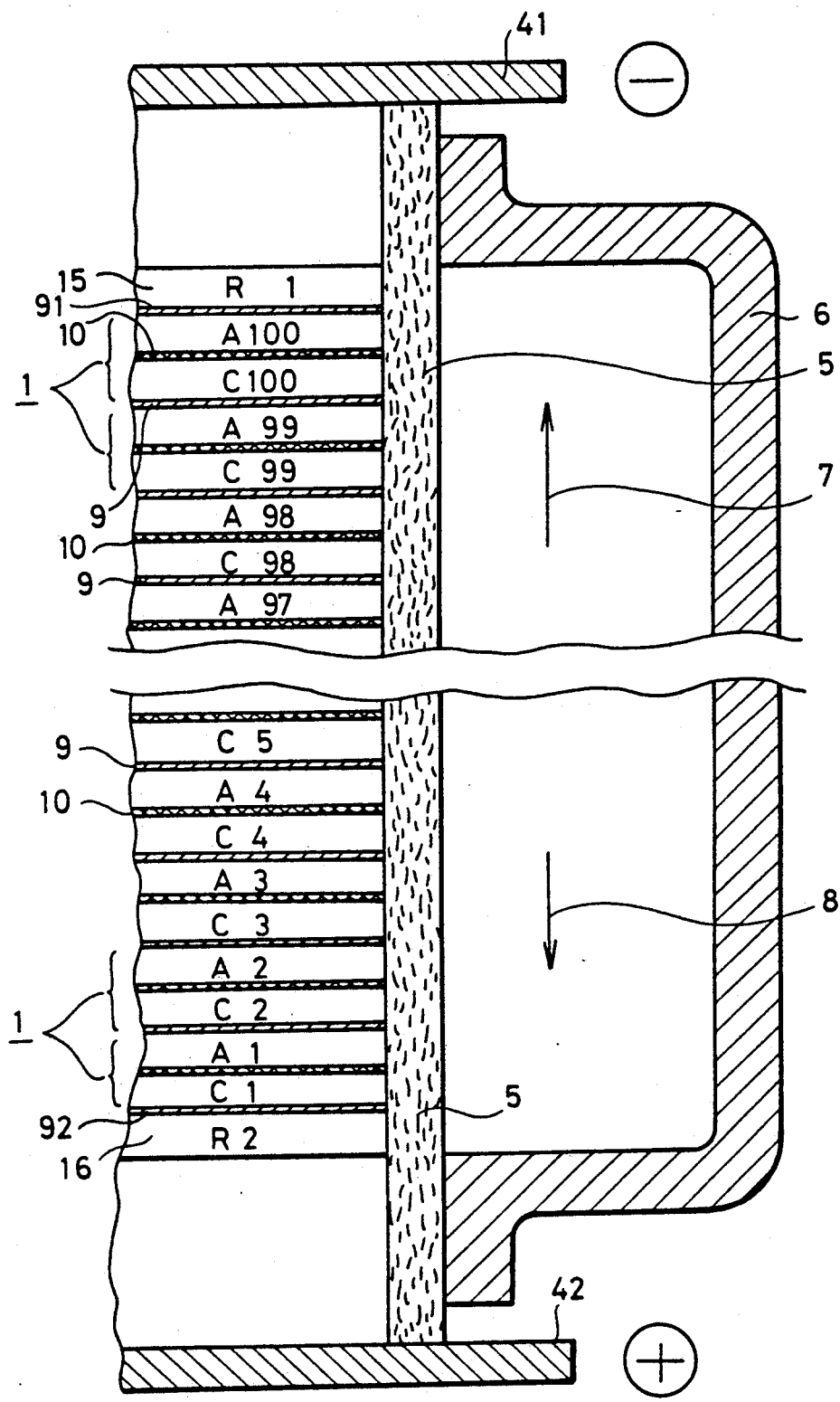
Figure 5:
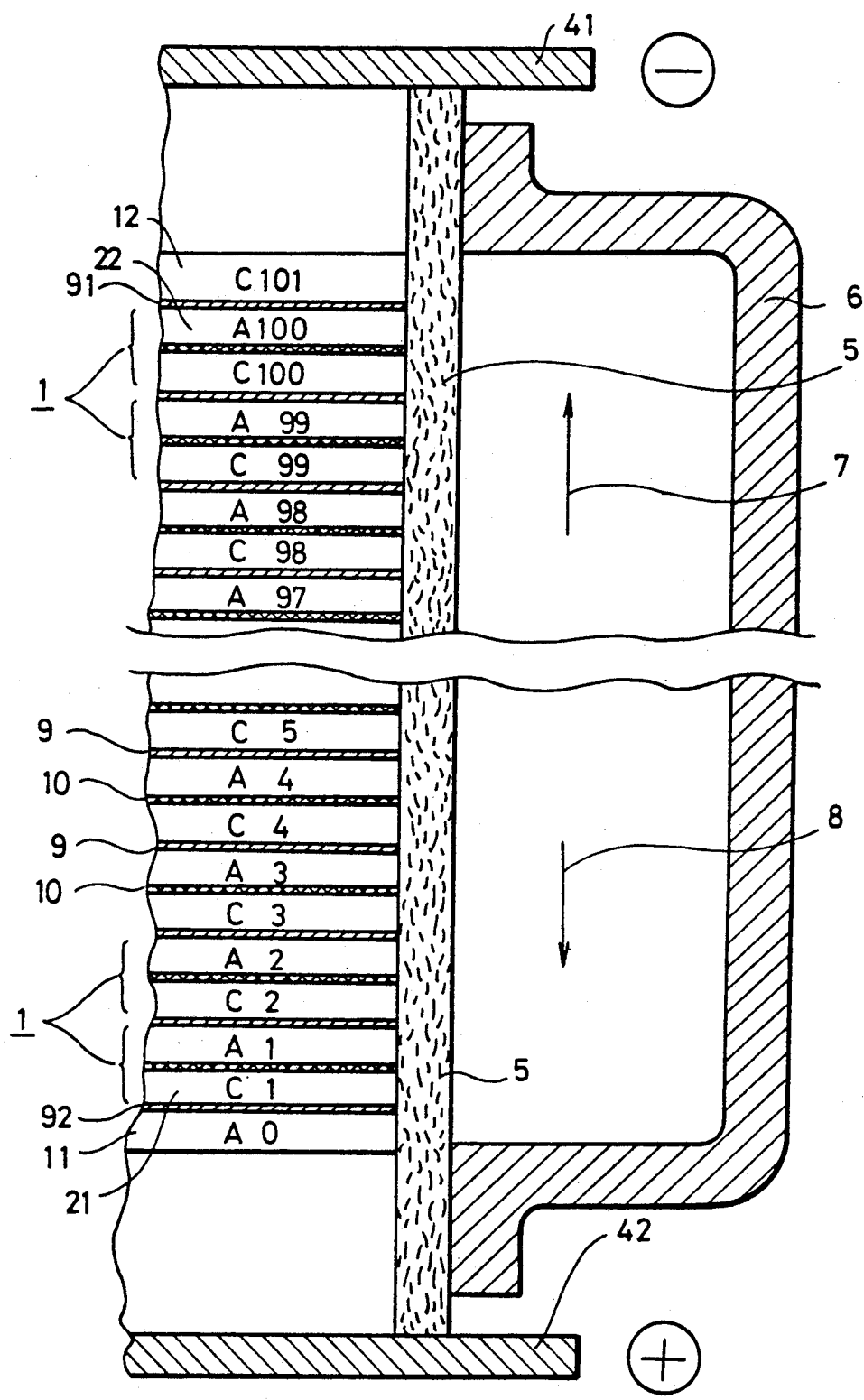
Figure 1:
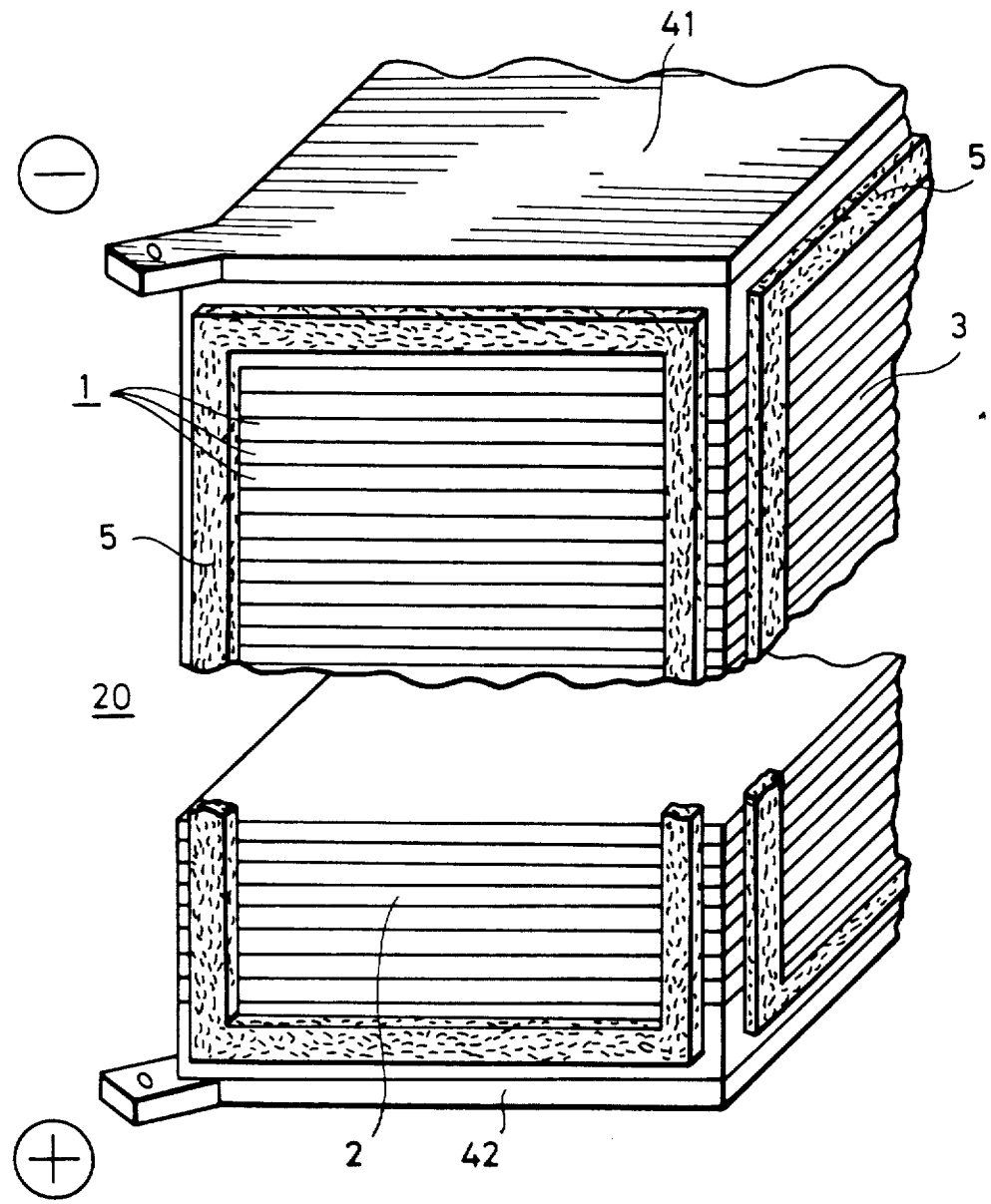
Figure 2:
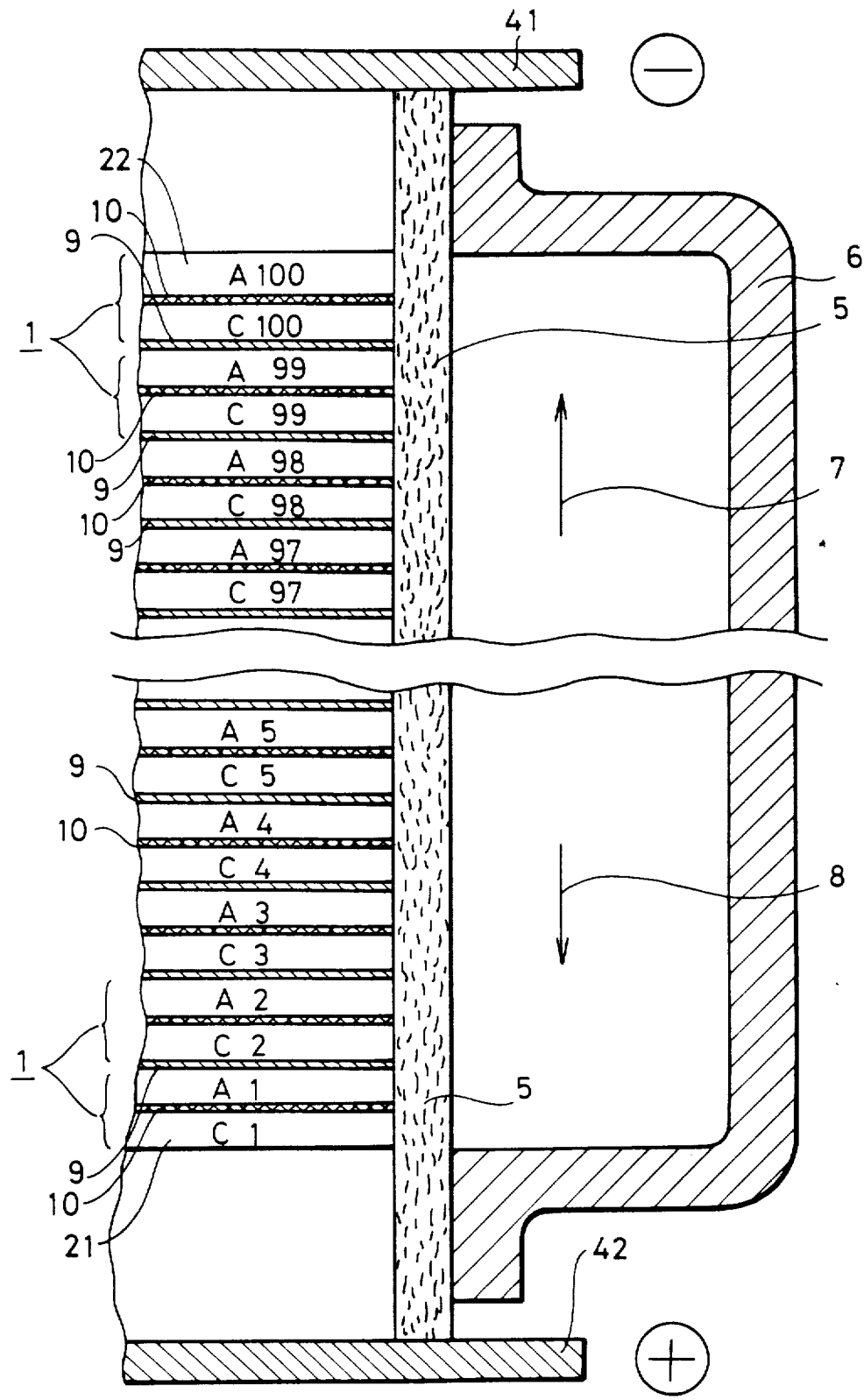
Figure 3:
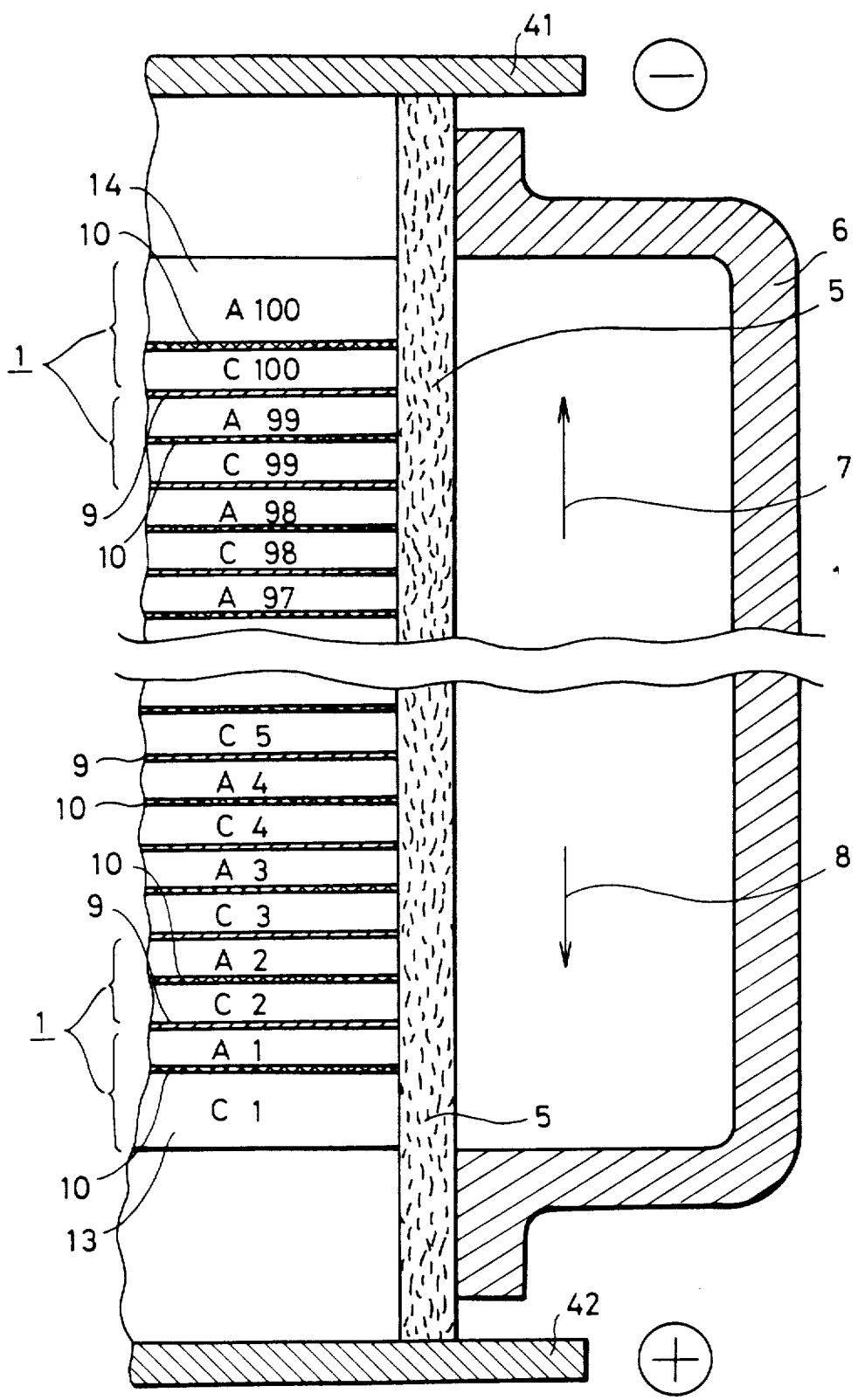
Figure 4:
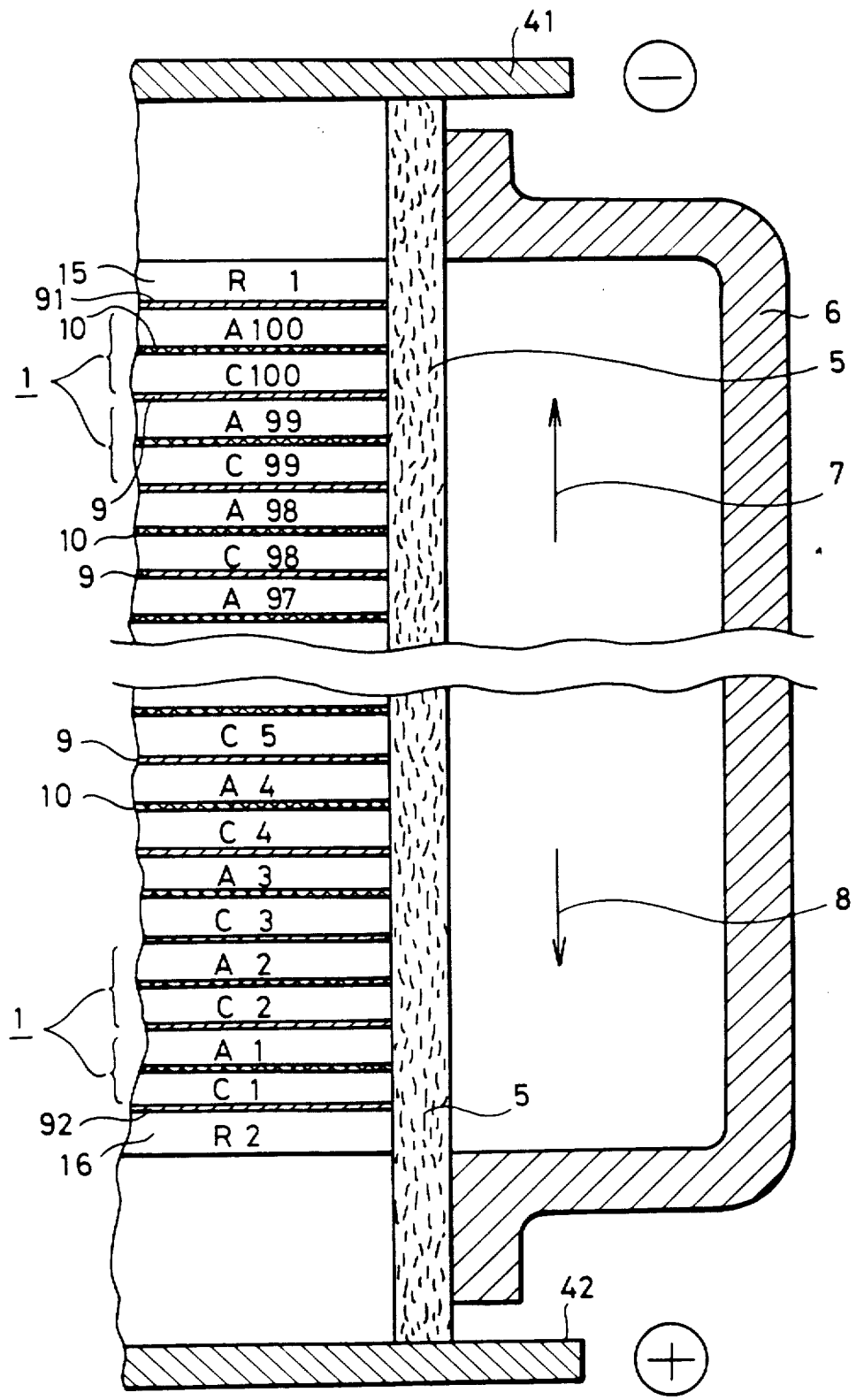
Figure 5:
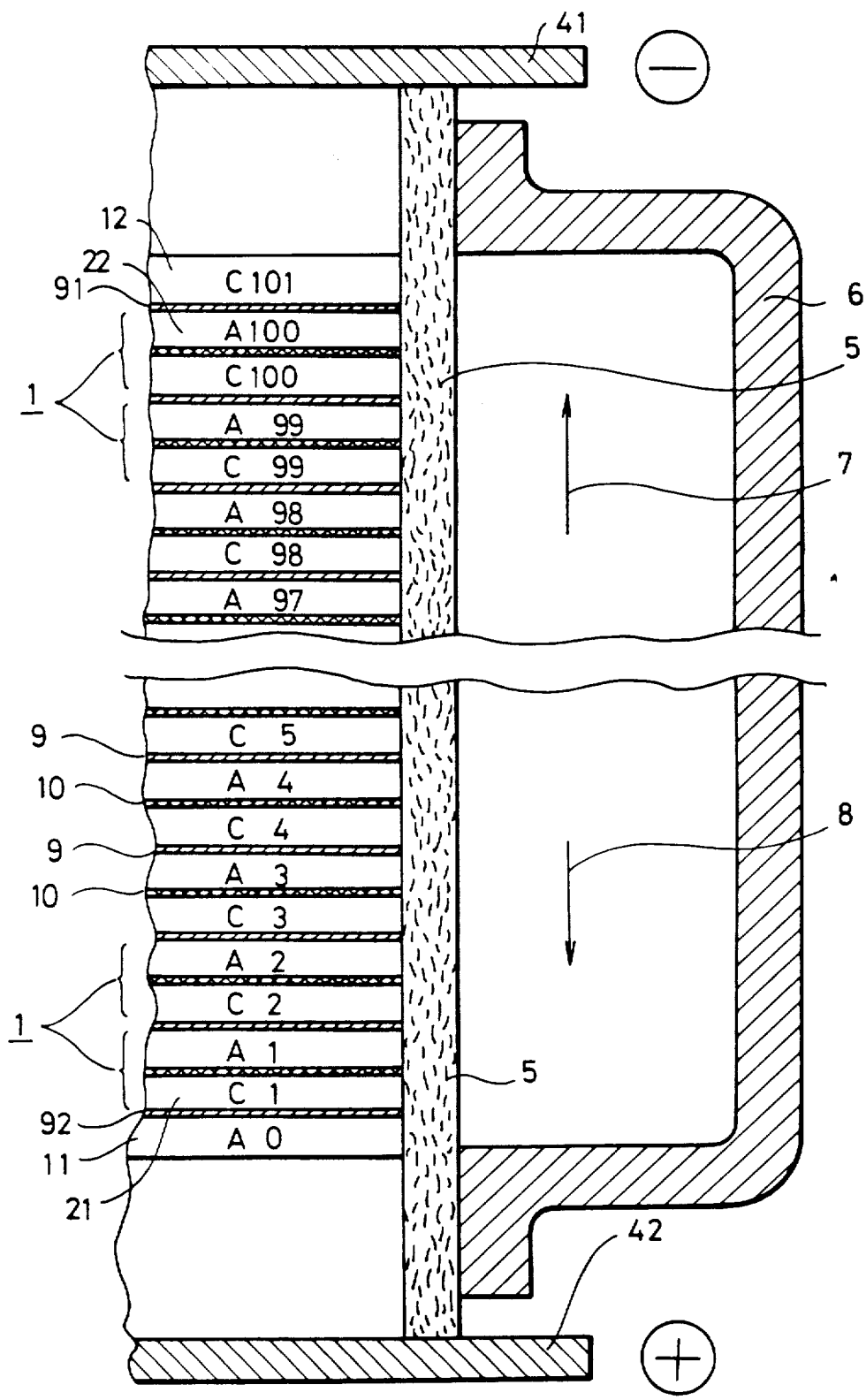

Now, referring to FIG. 5, a stack of molten carbonate fuel cells according to one embodiment of the present invention is described. As shown in FIG. 5, a "half-cell" anode 11 is disposed on the outer side of the end cathode (C1) 21 with the separator 92 interposed therebetween. The half-cell anode 11 comprises an anode section of an ordinary cell, which includes an anode reaction gas flow path and an anode electrode, and a gas sealing structure. Thus, the structure of the half-cell anode 11 can be the same as that of the anodes A1, A2, .... Different from the ordinary cell, this anode half-cell does not include a cathode, a cathode reaction gas flow path or a matrix. This is the reason why the term "half-cell" is used, and, therefore, this "half-cell" anode is given a denotion "AO". Similarly, a "half-cell" cathode 12 is disposed on the outer side of the end anode (A100) 22 with the separator 91 interposed therebetween. The half-cell cathode 12 comprises the cathode section of an oridnary cell, which includes a cathode reaction gas flow path and a cathode electrode, and a gas sealing structure. Thus, the half-cell cathode 12 can be of the same structure as the cathodes C1, C2, .... Similar to the half-cell anode, the half-cell cathode does not include anode electrode, an anode reaction gas flow path or a matrix. this is the reason why the term "half-cell" is used, and the denotation "C101" is used for the half-cell cathode.

The structure of the fuel cell stack of FIG. 5 is otherwise similar to the structure of the conventional molten carbonate fuel cell stack shown in FIG. 2, and, therefore, further explanation is omitted for the remaining portion of the cell stack of FIG. 5.

Since neither of the half-cell anode AO and the half-cell cathode C101 includes a matrix, almost all current is collected by the collector electrode plates 41 and 42 without ohmic loss presented, as in the case of the conventional fuel cell stack provided with the reservoir layers R1 and R2 shown in FIG. 4. Accordingly, even when electrolyte depletion or flooding occurs in the half-cell anode (AO) or cathode (C101), the function of the fuel cell stack is never affected. Furthermore, in the structure of FIG. 5, the use of the half-cell anode AO and the half-cell cathode C101 permits occurrence of such a situation that there is no electrolyte at all or the electrolyte overflows into the reaction gas flow path. In this respect, the present invention achieves great improvement, in comparison with the conventional structure shown in FIG. 3 in which the allowable amount of depletion or flooding of the electrolyte at A1 or C100 is small. In addition, since the half-cells AO and C101 include respective reaction gas flow paths, they can be maintained at given electrochemical potentials in the presence of the reaction gas atmosphere in any conditions, from the condition where there is substantially no electrolyte to the condition where the electrolyte overflows into the reaction gas flow path. More specifically, since each of the half-cell anode AO and the half-cell cathode C101 is in contact with the reaction gas on a major portion of the electrode, even when leakage current flows through the manifold gasket 5, substantially no concentration polarization occurs and, therefore, effective electrochemical potential differences can be maintained between AO and C1 and between A100 and C101. This causes substantially the same leakage current as those flowing between A1 and C2, between A2 and C3, ..., A99 and C100, to flow between AO and C1 and between A100 and C101. Accordingly, the electrolyte migrates between AO and C1 and between A100 and nC101 at substantially the same speed as between A1 and C2, between A2 and C3, ..., and between A99 and C100.

In the conventional structure shown in FIG. 4, once the electrolyte has filled completely the reservoir layer R1, no more electrolyte can be absorbed, and the reservoir layer R1 cannot be maintained at the potential in the presence of the oxidant gas atmosphere. Therefore, no more electrolyte can be received. In this conventional structure, the electrolyte flooding at A100-C100 tends to occur early.

In contrast, since the half-cell cathode C101 of the present invention includes a reaction gas flow path and no reaction gas flows through this reaction flow path, the electrolyte overflowing into this reaction gas, out into the manifold attached in the oxidant outlet side of the stack. thus, even after the half-cell cathode C101 has been completely filled with the electrolyte, the electrolyte can be absorbed further. Furthermore, because the electrode area with which the oxidant gas is in contact is large, concentration polarization does not occur and the potential in the presence of the oxidant gas atmosphere can be continuously retained. Thus, the electrolyte migration between A100 and C101 is not interrupted, and, therefore, there will be no flooding of A100-C100 with the electrolyte. On the other hand, the electrolyte depletion at the half-cell anode AO can be eliminated by replenishing the half-cell anode AO with the electrolyte when regular inspections of the battery are performed. At such regular inspections, the half-cell cathode C101 may be found full of the electrolyte, but it is not necessary to remove the electrolyte from C101, and, therefore, continuous operation of the battery is possible. According to a feature of the present invention, when the battery is used first time, the half-cell anode AO can be completely full of the electrolyte, and the half-cell cathode C101 can be completely empty of the electrolyte. This is possible because the half-cells are provided with respective reaction gas flow paths and, accordingly, sufficient contact of the electrodes of the half-cells with the reaction gases is available. On the other hand, in the conventional structure shown in FIG. 4, the reaction gas, and, therefore, when the reservoir layer R2 is completely filled with the electrolyte, the metallic portion of the reservoir layer is covered with the electrolyte liquid. Then, even a small leakage current can cause concentration polarization, and no electrochemical potential difference is produced between R2 and C1. Then, no migration of the electrolyte from R2 to C1 occurs. Therefore, it is not permitted to completely fill the reservoir layer R2 of the conventional fuel cell stack of FIG. 4 with the electrolyte.

The structures of the half-cell anode AO and the half-cell cathode C101 are the same as those of other anodes and cathodes, respectively. Accordingly, the addition of the half-cell anode and half-cell cathode requires only parts for one cell, excluding a matrix, to be added and stacked, but no specially designed members are required. Thus, the life of stacks comprising hundreds of molten carbon fuel cells (though the stack being illustrated in FIG. 5 as comprising a hundred cells) can be largely extended by simply adding only members for one cell to the conventional stack structure. Like this, the economical contribution of the present invention is significant.

One disadvantage, which is considered to be only one disadvantage, of the molten carbonate fuel battery of the present invention is that the reaction gases which flow in the half-cell anode AO and the half-cell cathode C101 do not contribute to power generation. However, the end cells of a fuel cell stack are at low temperature and, accordingly, their power generation efficiency is essentially low. Furthermore, even if these half-cells could contribute to the power generation, their contribution would be only one in the hundreds, and, accordingly, such non-contribution to electric power generation of the half-cells may be negligible. However, the saving of the reaction gases can be achieved by partially closing the outlet ports of the reaction gas flow paths of AO and C101. Even if the outlet ports are partly closed, it does not impede the supply of the gases to AO and C101, but waste of teh gases can be minimized.

As described above, according to the present invention, in a stack of cells each comprising an anode electrode, an anode reaction gas flow path, a cathode electrode, a cathode reaction gas flow path and a matrix, with separators disposed between adjacent cells in the stack, the cells at the respective ends of the stack including the end anode and end cathode, respectively, defining the negative and positive ends of the stack, a half-cell anode that includes an anode electrode and an anode reaction gas flow path but not a matrix is disposed in the outer side of the end cathode with a separator interposed therebetween, and a half-cell cathode that includes a cathode electrode and a cathode reaction gas flow path but not a matrix is disposed on the outer side of the end anode with a separator interposed therebetween. With this arrangement, the effects of the electrolyte migration can be made small relative to those in conventional stacks, and the stacks can be manufactured with a reduced cost.

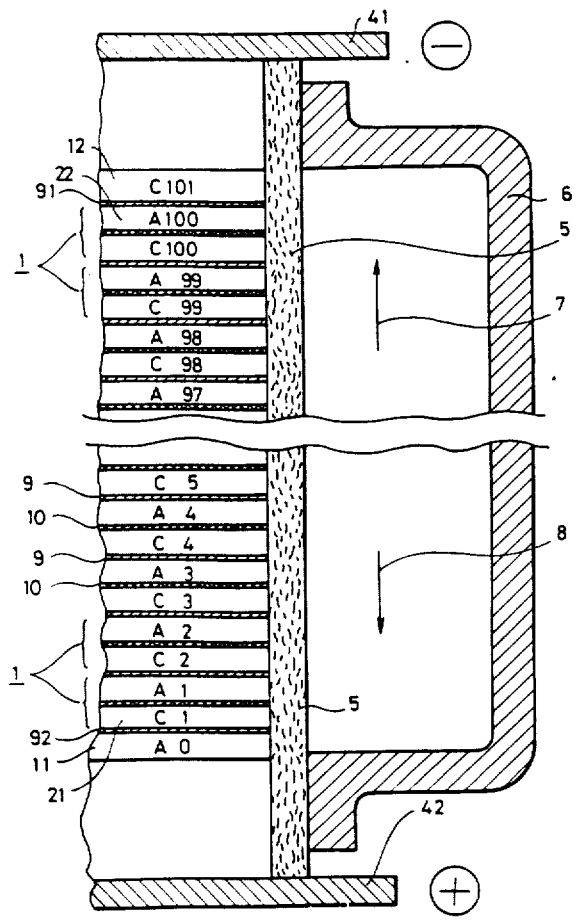

What is claimed is:

1. A molten carbonate fuel battery comprising a stack of molten carbonate fuel cells with separators disposed between adjacent cells, each cell including an anode electrode, an anode reaction gas flow path, a cathode electrode, a cathode reaction gas flow path and a matrix, the cells at the respective ends of the stack including the end anode and end cathode which define the negative and positive ends of the stack, respectively; said stack further including an half-cell anode disposed on the outer side of said end cathode of the stack with a separator disposed between said end cathode and said half-cell anode, and a half-cell cathode disposed on the outer side of said end anode of the stack with a separator disposed between said end anode and said half-cell cathode, said half-cell anode including an anode electrode and an anode reaction gas flow path, but not including a matrix, said half-cell cathode including a cathode electrode and a cathode reaction gas flow path, but not including a matrix.

2. A molten carbonate fuel battery according to claim 1 wherein said half-cell anode is of substantially the same structure as the other anodes constituting the cells in the stack, and said half-cell cathode is of substantially the same structure as the other cathodes constituting the cells in the stack.

* * * * *

UNITED STATES PATENT AND TRADEMARK OFFICE
CERTIFICATE OF CORRECTION

PATENT NO. : 5,019,464

DATED : May 28, 1991

INVENTOR(S) : Mitsuda et al

Page 1 of 7

It is certified that error appears in the above-identified patent and that said Letters Patent is hereby corrected as shown below:

The title page showing the illustrative figure should be deleted and therefor substitute the attached title page.

The sheets of drawings consisting of Figs. 1-5 should be deleted and therefor substitute the correct drawing sheets consisting of Figs. 1-5, as shown on the attached pages.

Signed and Sealed this

Twenty-third Day of February, 1993

*Attest:*

STEPHEN G. KUNIN

*Attesting Officer*  *Acting Commissioner of Patents and Trademarks*

United States Patent [19]

Mitsuda et al.

[11] Patent Number: 5,019,464
[45] Date of Patent: May 28, 1991

[54] MOLTEN CARBONATE FUEL BATTERY WITH ELECTROLYTE MIGRATION CONTROL

[75] Inventors: Kenro Mitsuda; Hideo Maeda; Hiroaki Urushibata; Toshiaki Murahashi, all of Amagasaki, Japan

[73] Assignee: Mitsubishi Denki Kabushiki Kaisha, Tokyo, Japan

[21] Appl. No.: 499,656

[22] Filed: Mar. 27, 1990

[30] Foreign Application Priority Data

Aug. 3, 1989 [JP] Japan .................................. 1-203221

[51] Int. Cl.⁵ .............................................. H01M 8/14
[52] U.S. Cl. ........................................ 429/34; 429/16
[58] Field of Search .................. 429/16, 34, 38, 39, 429/12

[56] References Cited

U.S. PATENT DOCUMENTS 4,579,788 4/1986 Marianowski et al. ............... 429/16
4,643,954 2/1987 Smith ..................... 429/26
4,761,348 8/1988 Kunz et al. ............... 429/35

OTHER PUBLICATIONS

Journal of Electrochemical Society, vol. 134, No. 1, pp. 105–113.

Primary Examiner—Anthony Skapars
Attorney, Agent, or Firm—Thomas Morrison

[57] ABSTRACT

A molten carbonate fuel battery comprises a stack of molten carbonate fuel cells. A half-cell anode and a half-cell cathode are disposed at the positive and negative ends which are defined by the end cathode and end anode, respectively, of the stack, with respective separators disposed therebetween. The half-cell anode includes an anode electrode and an anode reaction gas flow path, but does not include a matrix, and the half-cell cathode includes a cathode electrode and a cathode reaction gas flow path, but does not include a matrix.

2 Claims, 5 Drawing Sheets